(12) United States Patent
Mateev et al.

(10) Patent No.: US 10,963,521 B2
(45) Date of Patent: Mar. 30, 2021

(54) HANDLING LARGE STREAMING FILE FORMATS IN WEB BROWSERS

(71) Applicant: VMware, Inc., Palo Alto, CA (US)

(72) Inventors: Tihomir Krasimirov Mateev, Sofia (BG); Etienne Robert Le Sueur, New York, NY (US)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 15/388,857

(22) Filed: Dec. 22, 2016

(65) Prior Publication Data
US 2018/0181655 A1 Jun. 28, 2018

(51) Int. Cl.
| | | |
|---|---|---|
| G06F 7/00 | (2006.01) | |
| G06F 16/951 | (2019.01) | |
| G06F 16/11 | (2019.01) | |
| G06F 9/455 | (2018.01) | |
| G06F 16/9538 | (2019.01) | |

(52) U.S. Cl.
CPC ........ *G06F 16/951* (2019.01); *G06F 9/45533* (2013.01); *G06F 16/113* (2019.01); *G06F 16/9538* (2019.01); *G06F 2009/45595* (2013.01)

(58) Field of Classification Search
CPC ......... G06F 17/30864; G06F 17/30073; G06F 9/45558; G06F 16/951; G06F 16/9538; G06F 16/113
USPC .................. 707/661, 613, 999.003, 999.205
See application file for complete search history.

(56) References Cited

U.S. PATENT DOCUMENTS

| | | | | |
|---|---|---|---|---|
| 2007/0083498 | A1* | 4/2007 | Byrne | G06F 17/30864 |
| 2008/0109498 | A1* | 5/2008 | Bhandiwad | G06F 16/113 |
| 2012/0084769 | A1* | 4/2012 | Adi | G06F 8/63 717/174 |
| 2015/0106810 | A1* | 4/2015 | Ciano | G06F 9/45533 718/1 |
| 2016/0057201 | A1* | 2/2016 | Xu | H04L 67/10 709/219 |
| 2017/0293717 | A1* | 10/2017 | Yu | G06F 19/321 |

OTHER PUBLICATIONS https://github.com/matthewp/bitisx.
https://en.wikipedia.org/wiki/Open_Virtualization_Format.
http://www.gnu.org/software/tar/manual/html_node/Standard.html.

* cited by examiner

*Primary Examiner* — Md I Uddin
(74) *Attorney, Agent, or Firm* — Patterson + Sheridan, LLP

(57) ABSTRACT

An approach for parsing and streaming contents of archive files is disclosed. In one embodiment, a client script executed by a web browser parses an archive file based on its archival format, without loading the entire archive file into memory. For example, the client may read only header fields of files inside a TAR format archive file to identify the files therein and their locations, while skipping contents of those files. Having identified files inside the archive file and their locations, the client further reads and processes files that are small enough to be handled by the web browser, while streaming to appropriate endpoints contents of other files such as those that are too large to be handled by the web browser. Such streaming may include slicing large files into sections the web browser can handle and attaching the sections to HTTP requests that are sent to appropriate endpoints.

14 Claims, 4 Drawing Sheets

HANDLING LARGE STREAMING FILE FORMATS IN WEB BROWSERS

BACKGROUND

Web browsers are software applications for, among other things, finding, retrieving, and displaying information on networks such as the Internet. Web browsers have traditionally been limited in the size of files they are capable of handling. For example, loading a file larger than one gigabyte will cause some browsers to crash or display an error message. As a result, very large files, such as open virtual appliance (OVA) archive files that include virtual disk images and other files representing virtual machines (VMs), cannot be read and handled by traditional web browsers. In particular, to deploy VMs in an OVA file to a datacenter, certain files such as the VMs' virtual disk images need to be sent to appropriate destinations (e.g., datastores in the datacenter). However, the OVA file may be so large that it cannot be loaded in a web browser and parsed so that the virtual disk images and other files can be sent to the requisite destinations.

SUMMARY

One embodiment provides a computer-implemented method of processing an archive file in a web browser. The method generally includes parsing the archive file to identify files therein and locations of the files in the archive file, where the identified locations include beginnings and sizes of the files in the archive file. The method further includes, for each of one or more of the identified files: dividing a portion of the archive file into sections based on start and end locations of the identified file in the archive file, and uploading the sections to an endpoint associated with the identified file.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments disclosed herein relate to techniques for parsing and streaming contents of archive files. In one embodiment, a client script executed by a web browser parses an archive file based on its archival format without loading the entire archive file into memory. For example, the client may read only header fields of each file inside an open virtual appliance (OVA) archive file, which is in the TAR format, to identify files in the OVA file and their locations, while skipping the contents of the files themselves in the OVA file. Having identified the files and their locations in the archive file, the client further reads and processes those files that are small enough to be loaded into memory and handled by the web browser, while streaming to appropriate endpoints the contents of other files, such as files that are too large to be handled by the web browser. Such streaming may include slicing a large file into sections that the web browser can handle and attaching the sections to HTTP requests that are sent to the appropriate endpoints. For example, virtual disk image files contained in an OVA file may be streamed to datastores accessible by host computers which execute virtual machines (VMs) using those virtual disk images.

Figure 1:
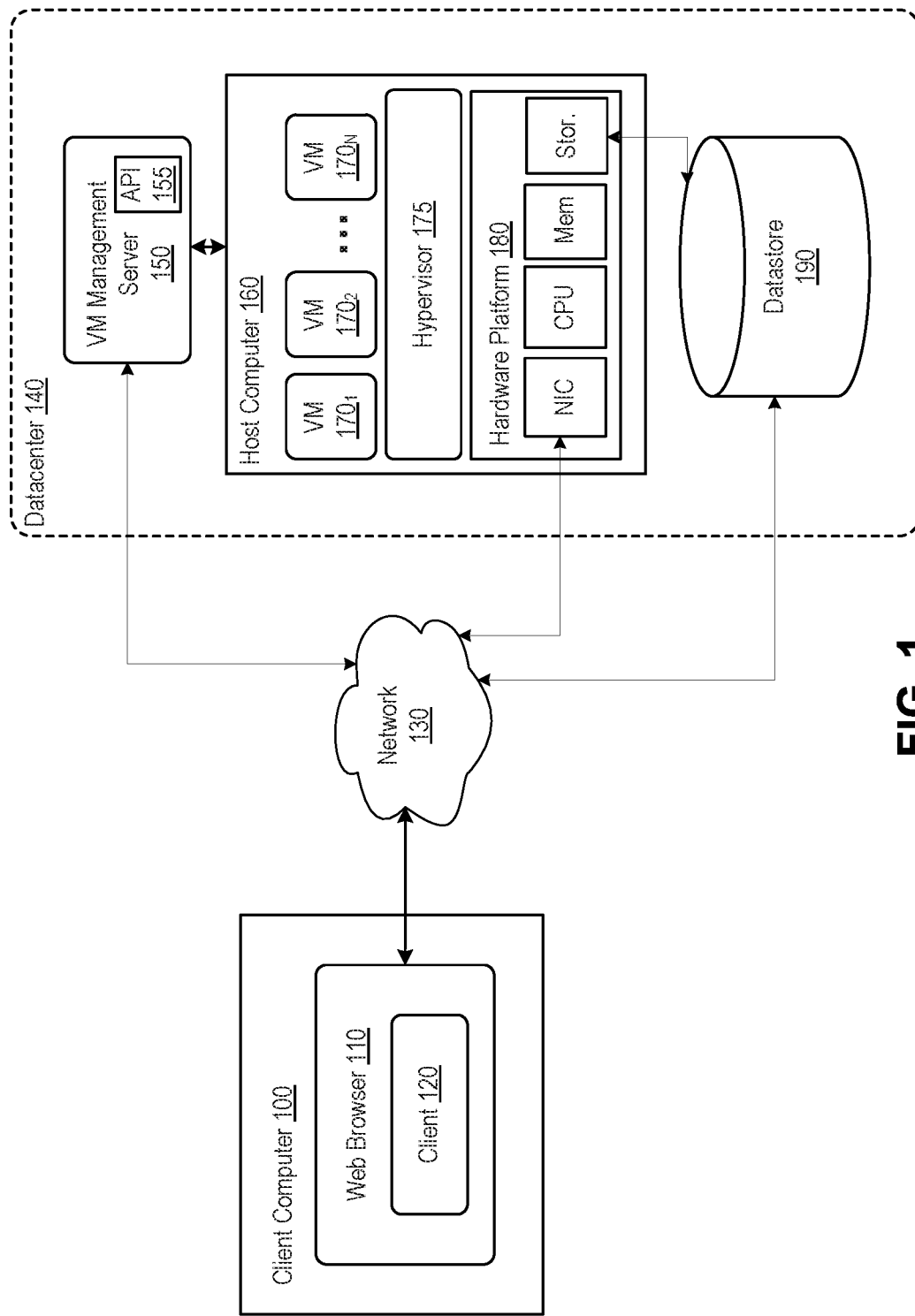
FIG. 1 is a diagram depicting a computing environment in which one or more embodiments may be implemented.

FIG. 1 depicts a computing environment in which one or more embodiments may be implemented. Illustratively, the computing environment includes a client computer 100 connected over a network 130 (e.g., the Internet) to a host computer 160 and a virtual machine (VM) management server 150, which as shown are in a datacenter 140. VM management server 150 may communicate with host computer 160 over a local connection or, alternatively, over a remote network connection (not shown). Although a single host computer 160 and VM management server 150 are shown, it should be understood that datacenter 140 may generally include any number of host computers and VM management servers.

Host computer 160 is constructed on a server grade hardware platform 106, such as an x86 architecture platform. As shown, hardware platform 106 of host 104 includes conventional components of a computing device, such as one or more central processing units (CPU), system memory, a network interface, a storage interface, and other I/O devices such as, for example, a mouse and keyboard (not shown).

Host computer 160 also provides a virtualization layer that abstracts processor, memory, storage, and networking resources of hardware platform 106 into multiple virtual computing instances that run concurrently therein, the virtual computing instances being implemented as virtual machines $170_1$ to $170_N$ (collectively referred to as VMs 170). Illustratively, host computer 160 is in communication with a datastore 190, which in one embodiment is a storage system that persistently stores data commonly used by VMs 170, such as VM disk image data. Each of VMs 170 run on top of a software interface layer in host computer 160, referred to herein as a hypervisor 175, that enables sharing of the hardware resources by VMs 170. One example of hypervisor 175 that may be used in the embodiments described herein is a VMware ESX® hypervisor, which is provided as a component of the VMware vSphere® product commercially available from VMware, Inc. of Palo Alto, Calif. Hypervisor 175 may run on top of an operating system of host computer 160 or directly on hardware components of host computer 160.

VMs 170 are software implementations of physical computing devices and execute programs much like a physical computer. In embodiments, a VM implements, in software, a computing platform that supports the execution of software applications under the control of a guest operating system (OS). As such, virtual machines typically emulate a particular computing architecture. In FIG. 1, execution space 120 includes VMs $170_1$-$170_N$. Each VM 170 shown supports the execution of one or more applications, each of which executes under the control of a particular guest OS.

Virtual machine management server 150 controls provisioning of VMs, powering of VMs on and off, and resource management of the VMs in the host computers, among other things. In a particular embodiment, VM management server 150 may run vCenter®, a product commercially available from VMware, Inc. Although shown as a separate computer system, it should be recognized that VM management server 150 may instead be implemented in other ways, such as a VM that runs in host computer such as host computer 160. The combination of virtual machine management server 150, host computers, and components therein form a virtualized computing system.

As further shown in FIG. 1, a web browser 110 runs in client computer 100 that is connected over network 110 to host computer 160 and VM management server 150. Illustratively, web browser 110 executes a client script 120 (e.g., a JavaScript script) configured to parse archive files to identify files therein and their locations within the archive files, as well as to stream such files in the archive files to appropriate destinations. For example, client 120 may parse and stream contents of an OVA archive file representing one or more VMs that a user selects to deploy to host computer 160 in datacenter 140. As shown, VM management server 150 provides an application programming interface (API) 155 (which may alternatively be provided by host computer 160) that client 120 may invoke to create new VMs that execute in host computer 160 based on VM configuration information read from the OVA archive file. An example of API 155 is the vSphere® API available from VMware, Inc. Client 120 may further stream VMs' disk images and CD ROM/floppy images from the OVA archive file to datastore 190 (or multiple datastores), among other things.

Figure 2:
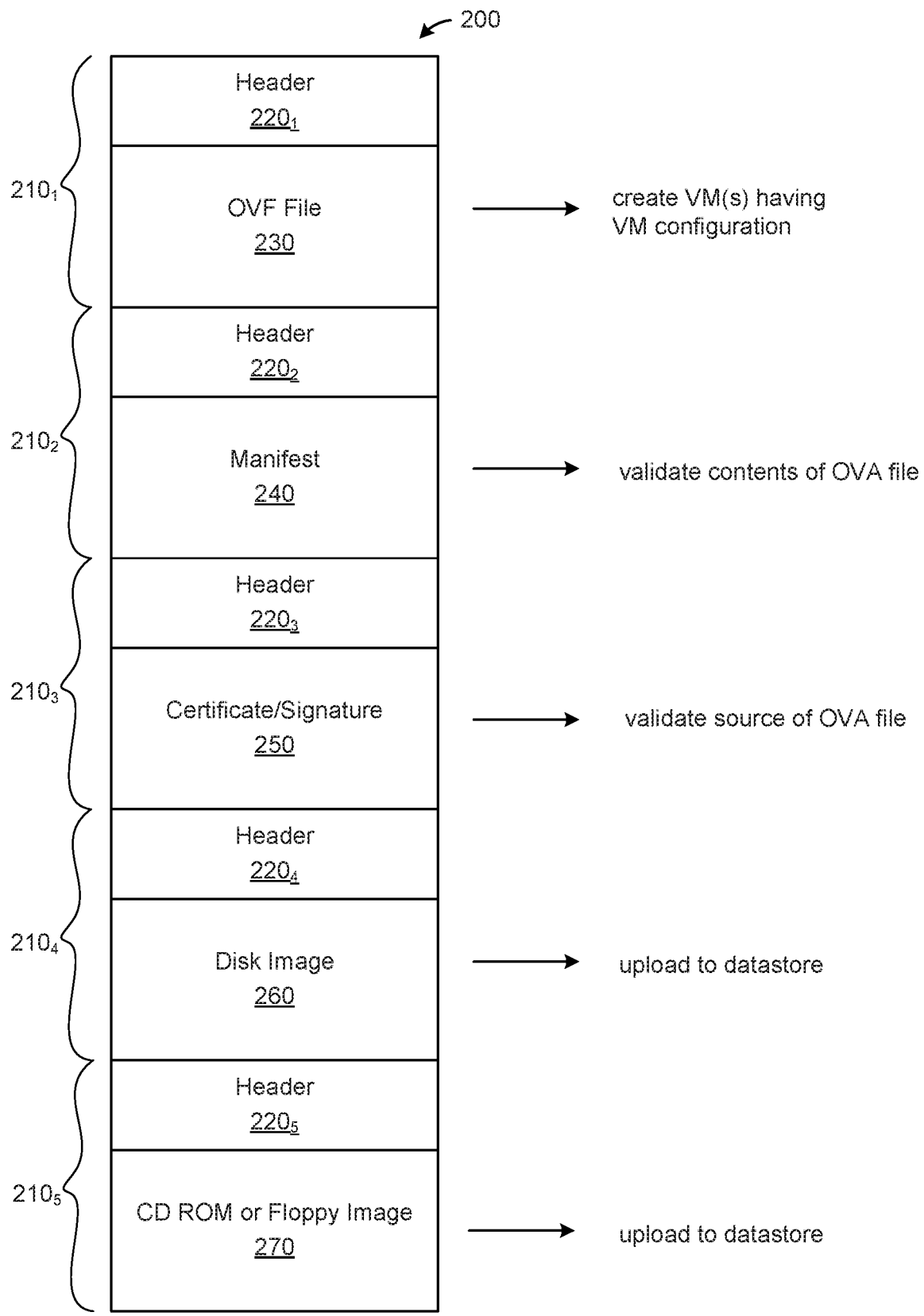
FIG. 2 illustrates contents of an example open virtual appliance file and handling of such a file, according to an embodiment.

FIG. 2 illustrates contents of an example OVA archive file 200 and handling of such a file, according to an embodiment. As shown, OVA file 200 is a TAR format archive file of an Open Virtualization Format (OVF) package that represents one or more VMs. OVF is an open standard developed for packaging and distributing software to be run in virtual machines, with the various files of an OVF package representing one or more VMs. An OVA file, such as OVA file 200, is a single archive file including the files of an OVF package, and the single OVA file 200 may be more easily downloaded, distributed, etc. than the multiple files of an OVF package.

As shown, OVA file 200 includes file entries $210_{1-5}$, each of which includes a file header $220_i$ and file contents. Virtual machine(s) may be exported to such an OVA file 200 using commercially available tools, with OVA file 200 capturing the states of the exported VM(s) into a self-contained package. Illustratively, OVA file 200 includes an OVF file 230, a manifest 240, a certificate/signature file 250, a disk image file 260, and a CD ROM or floppy image file 270. Although one disk image file 260 and one CD ROM/floppy image file 270 are shown for illustrative purposes, it should be understood that OVA file 200 may generally include any number of disk image files and CD ROM/floppy image files.

OVF file 230 is an eXtensible Markup Language (XML) format file that includes information describing a VM's configuration (or multiple VMs' configurations). The configuration information may include, e.g., VM name(s), virtual hardware requirements, operating system type, dependency on external systems, references to other files in the OVA file, and human-readable descriptions.

Manifest file 240 and certificate/signature file 250 are optional files used for checking the integrity and authenticity of OVA file 200, respectively. In one embodiment, manifest file 240 includes checksums of the other files in OVA file 200, while certificate/signature file 250 includes a X.509 certificate and a checksum of manifest file 240. The checksums in manifest file 264 may be used to validate the contents of OVA file 200 after it is, e.g., downloaded from an arbitrary location. The X.509 certificate and checksum in certificate/signature file 250 may be used to verify that OVA file 200 includes the expected contents, i.e., provenance verification, proving that OVA file 200 is from a reputable source.

Disk image file 260 is a file that stores contents of a VM's hard disk drive, such as an operating system or other data. For example, disk image file 260 may be a .vmdk file. In one embodiment, disk image file 260 may be stored in a compressed, sparse format, in OVA file 200.

CD ROM or floppy image file 270 is an additional resource file that may optionally be exported along with a VM to OVA file 200 if the CD ROM or floppy image 270 is attached to the VM at the time the VM is being exported. In one embodiment, the user may be permitted to choose whether to export such CD ROM or floppy image files.

It should be understood that, due to the limitations of traditional web browsers, web browser scripts cannot easily obtain access to the amounts of temporary storage needed to store large files such as disk image file 260, and storing such files in memory may also be infeasible due to the size of those files and memory size constraints. As a result, embodiments disclosed herein do not attempt to extract and work with the individual VM disk images or CD ROM/floppy images from an OVA archive. Instead, as discussed in greater detail below, client 120 executed by web browser 110 is configured to parse archive files such as OVA file 200 to identify the files therein and their locations within the archive file based on the metadata in file headers $220_i$. Client 120 is further configured to read portions of OVA file 200 known to be small enough to be handled by web browser 110, such as OVF file 230, while slicing files that are larger than can be handled by web browser 110, such as disk image file 260, into sections that are attached to HTTP requests and sent to desired endpoints. Illustratively, client 120 is configured to read manifest file 240 and certificate/signature file 250 and use them to validate the contents and source of OVA file 200. Client 120 is further configured to parse OVF file 230 and use the VM configuration information therein in an API 155 call to create one or more VMs, as well as upload disk image file 260 and CD ROM or floppy image 270 (as well as other disk image files and CD ROM/floppy images files, if any) for the VMs that are created.

Figure 3:
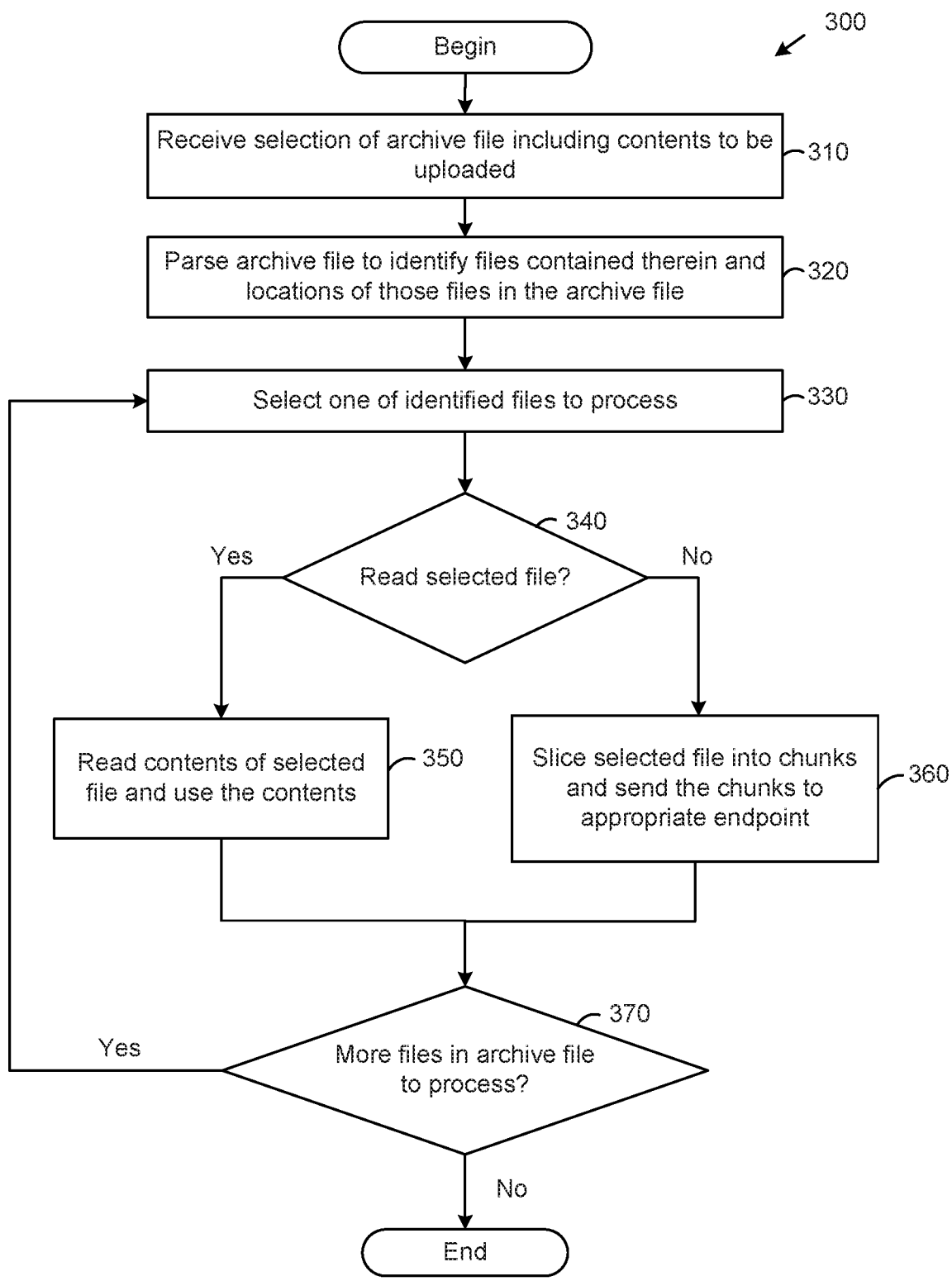
FIG. 3 is a flow diagram depicting a method for identifying and streaming contents of an archive file, according to an embodiment.

FIG. 3 is a flow diagram depicting a method for identifying and uploading contents of an archive file, according to an embodiment. As shown, method 300 begins at step 310, where client 120 receives a selection of an archive file including contents to be uploaded. In one embodiment, the archive file is an OVA file, such as OVA file 200, that represent VM(s), and a user may select via a user interface provided by web browser 110 to deploy those VM(s) in one or more host computers, such as host computer 160.

At step 320, client 120 parses the archive file to identify files contained therein and locations of those files in the archive file. In one embodiment, such parsing includes reading metadata associated with each file inside the archive to identify the files and their locations, while skipping over contents of the files themselves. Returning to the example of an OVA archive file, which is stored in the TAR format, the OVA archive may include a series of file entries, each of which is made up of a 512 byte file header and contents of the file itself. The file header for each file includes metadata about the file, such as the file's name and size in bytes, among other things. In such a case, client 120 may read the file headers and build up metadata on the files inside the OVA archive, while skipping over the contents of the files by not reading the bytes of the archive after the file header storing those contents, as indicated by the file sizes. Then, using the metadata read from the file headers, client 120 identifies the names of files in the OVA file and their locations, including (1) the offset of each file inside the OVA file, and (2) the size of each file. In one embodiment, client 120 may read 512 bytes from the OVA file corresponding to a file header, record the byte location of the end of the header (i.e., the beginning of the actual file) and the size of the file, then skip over header.length bytes corresponding to the contents of the file, read another 512 bytes corresponding to the next file header, etc., until the end of the OVA file. By reading file headers but not file contents, client 120 can avoid loading the entire OVA into memory and crashing the web browser or causing an error message to be displayed.

At step 330, client 120 selects one of the identified files to process. Returning to the example of the OVA archive file, as noted above, such a file may include one or more disk images, an OVF file (in XML format) describing configurations of one or more VMs, a manifest file with checksums of the other files in the OVA file, a certificate/signature file which can be used to verify that the OVA file includes expected contents (i.e., provenance verification), and optional CD ROM or floppy images that are attached to the VMs. Client 120 may select and process such files inside the OVA file in turn.

At step 340, client 120 determines whether to read the selected file. Generally, some files inside the archive file may be small enough to be handled by the web browser, while other files may be too large to be loaded into memory. Client 120 may avoid crashing web browser 110 by not reading the entirety of the files that are too large to be handled by web browser 110. Further, it should be understood that client 120 may be configured in some embodiments to only read certain types of files, regardless of whether they are too large to be handled by web browser 110 or not. For example, in the case of OVA files, client 120 may only read the OVF, manifest, and certificate/signature files in an OVA file while sending the other files straight to datastore(s).

If client 120 determines the selected file should be read, then, at step 350, client 120 reads contents of the selected file and uses such contents, as appropriate. Returning to the OVA file example, the OVF, manifest, and certificate/signature files may be read by client 120. In such a case, client 120 may use the manifest and certificate/signature files to validate that the OVA file's contents are intact and are from a reputable source, respectively. Further, client 120 may read the OVF file and parse VM configuration information contained therein, which client 120 may then use in an API 155 call to create one or more VMs with those configuration attributes.

If client 120 determines that the selected file should not be read, then, at step 360, client 120 slices the selected file into sections and sends the sections to an appropriate endpoint. In one embodiment, client 120 may slice the disk image and CD ROM/floppy image files in an OVA file into sections and then upload the sections to datastores that are accessible by host computer(s) which execute VM(s) created by the API 155 call made using the OVF file configuration information, discussed above. If client 120 is a JavaScript script, for example, the Blob.slice( ) method may be used to create a new Blob object with a specified range of bytes from the disk image file or CD ROM/floppy image file. Client 120 may then attach the new Blob object to an HTTP request and send the Blob object to the appropriate datastore (e.g., in order to upload the archived file to the datastore). Alternatively, client 120 may send the new Blob object making up the disk image or CD ROM/floppy image to VM management server 140, which may then transfer the disk image or CD ROM/floppy image to the appropriate datastore.

It should be understood that the contents of an archive file may be copied and deployed to different host computers. In the OVA file example, VM management server 150 that handles the deployment of VMs in datacenter 100 may decide to place two (or more) VMs inside an OVA file on different host computers, e.g., for load balancing purposes, due to a particular storage policy, etc. In such a case, VM management server 150 may communicate this requirement to client 120, which may in some cases stream the disk images of the VMs to different datastores accessible by the different host computers. That is, after the archive file is parsed and files therein and their locations identified, client 120 may stream contents of the archive file to different places.

At step 370, client 120 determines whether there are additional files in the archive file to process. If there are additional files in the archive file, then method 300 returns to step 330, where client 120 selects another one of the files identified in the archive file to process. If, on the other hand, there are no additional files in the archive file to process, then method 300 ends.

Figure 4:
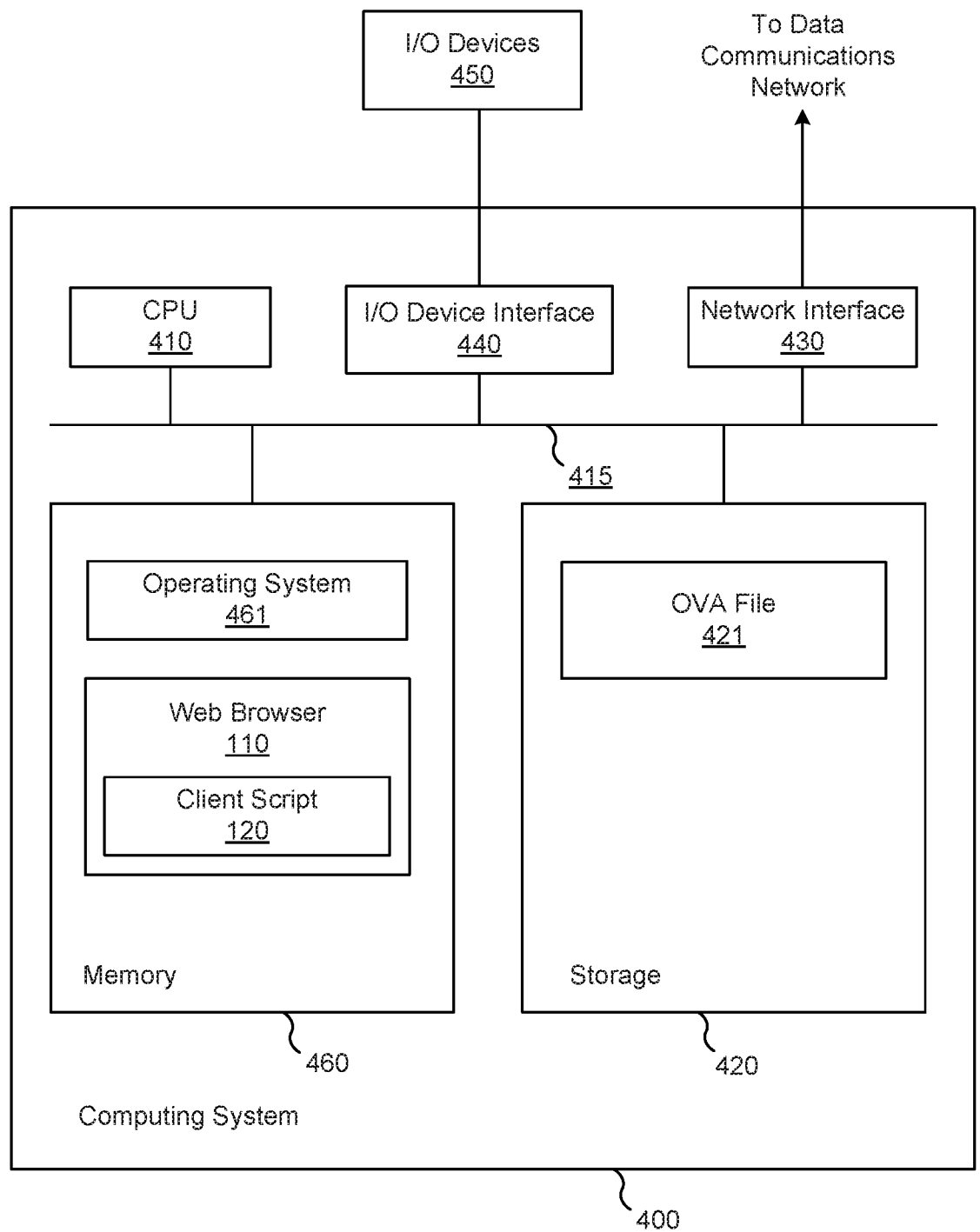
FIG. 4 illustrates a computer system in which an embodiment of a client script may be implemented.

FIG. 4 illustrates a computer system 400 in which an embodiment may be implemented. System 400 corresponds to client computer 100 in FIG. 1. As shown, system 400 includes, without limitation, a central processing unit (CPU) 410, a network interface 430, an interconnect 415, a memory 460, and storage 420. System 400 may also include an I/O device interface 440 connecting I/O devices 450 (e.g., keyboard, display and mouse devices) to the system 400.

CPU 410 retrieves and executes programming instructions stored in memory 460. Similarly, CPU 410 stores and retrieves application data residing in memory 460. Interconnect 415 facilitates transmission, such as of programming instructions and application data, between CPU 410, I/O device interface 440, storage 420, network interface 430, and memory 460. CPU 410 is representative of one or more of a single CPU, multiple CPUs, a single CPU having multiple processing cores, one or more graphics processing units (GPUs), and the like. And memory 460 is generally included to be representative of a random access memory. Storage 420 may be a disk drive storage device. Although shown as a single unit, storage 420 may be a combination of fixed or removable storage devices, such as fixed disc drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of system 400 shown in FIG. 4 may be distributed across multiple computing systems connected by a data communications network.

As shown, memory 460 includes an operating system 461 and web browser 110 executing client script 120. Illustratively, operating system 461 may include Linux® or Microsoft Windows® (or some other operating system). Client script 120 is configured to identify and stream contents of archive files. In one embodiment, client script 120 may be configured to receive a selection of an archive file 421 which is stored in storage 420 and includes contents to be uploaded, parse the archive file to identify files contained therein and locations of those files in the archive file, select each of the identified files to process in succession, determine whether to read the selected file, read contents of the selected file and use such contents if the selected file should be read, and slice the selected file into sections and send the sections to an appropriate endpoint if the selected file should not be read, as discussed above with respect to FIG. 3.

Although discussed above primarily with respect to OVA files, it should be understood that techniques disclosed herein may be applied to parse and stream contents of other types of archive files, such as other TAR archives. Further, although discussed above with respect to a JavaScript script, it should be understood that the client that parses and streams contents of the archive file may also be any other type of web browser script.

Advantageously, techniques disclosed herein permit archive files to be parsed and their contents used or streamed to appropriate endpoints, without loading the entire archive files into memory in a web browser. For example, an OVA file may be parsed and VM disk images therein identified and uploaded to one or multiple datastores accessible by host computers on which VM(s) represented by the OVA file are created. Experience has shown that techniques disclosed herein work with large OVA files including those from 8 to 16 GB in size.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of processing an archive file, which includes a plurality of files, in a web browser, the method comprising:
    parsing, by a script executed by the web browser, the archive file to identify the plurality of files in the archive file and locations of the plurality of files in the archive file, wherein the identified locations include a respective offset and size of each of the plurality of files in the archive file, wherein parsing the archive file includes reading header fields of each of the plurality of files in the archive file to identify the plurality of files in the archive file but skipping contents of the plurality of files, and wherein skipping the contents of the plurality of files comprises refraining from locally storing the contents of the plurality of files, wherein:
        the archive file includes one or more virtual machine (VM) configuration files and one or more virtual disk images associated with one or more VMs,
        the one or more VMs are created based on the one or more VM configuration files in the archive file, and
        each of the one or more virtual disk images in the archive file is uploaded to a datastore accessible by a host computer which executes a corresponding one of the one or more created VMs; and
    for at least one of the plurality of files that are identified:
        dividing, by the script, a portion of the at least one file into sections based, at least in part, on a type of the at least one file or a size of the at least one file exceeding a certain threshold, and
        uploading, by the script, the sections to an endpoint on a network, the endpoint being associated with the file.

2. The method of claim 1, wherein uploading the sections to the endpoint associated with the file includes attaching each section of the sections to a respective Hypertext Transfer Protocol (HTTP) request and sending the section to the endpoint associated with the file.

3. The method of claim 1, wherein the one or more virtual disk images include at least two virtual disk images that are associated with respective VMs and are uploaded to distinct datastores accessible by host computers which execute each of the respective VMs.

4. The method of claim 1, wherein the archive file further includes:
    one or more CD ROM or floppy images attached to the one or more VMs, wherein sections of the CD ROM or floppy images are uploaded to datastores to which the one or more virtual disk images associated with the one or more VMs are uploaded;
    a manifest including checksums used to validate integrity of the files in the archive file; and
    a certificate file used to authenticate the archive file.

5. The method of claim 1, wherein the one or more VMs are created by invoking an application programming interface (API) provided by a hypervisor or a VM management application.

6. The method of claim 1, wherein the archive file is an Open Virtual Appliance (OVA) file or other TAR format file.

7. A non-transitory computer-readable medium comprising instructions executable by a computer, the computer having one or more physical central processing units (CPUs), wherein the instructions, when executed, cause the computer to perform a method for processing an archive file, which includes a plurality of files, in a web browser, the method comprising:
    parsing, by a script executed by the web browser, the archive file to identify the plurality of files in the archive file and locations of the plurality of files in the archive file, wherein the identified locations include a respective offset and size of each of the plurality of files in the archive file, wherein parsing the archive file includes reading header fields of each of the plurality of files in the archive file to identify the plurality of files in the archive file but skipping contents of the plurality of files, and wherein skipping the contents of the plurality of files comprises refraining from locally storing the contents of the plurality of files, wherein:
        the archive file includes one or more virtual machine (VM) configuration files and one or more virtual disk images associated with one or more VMs,
        the one or more VMs are created based on the one or more VM configuration files in the archive file, and
        each of the one or more virtual disk images in the archive file is uploaded to a datastore accessible by a host computer which executes a corresponding one of the one or more created VMs; and
    for at least one of the plurality of files that are identified:
        dividing, by the script, a portion of the at least one file into sections based, at least in part, on a type of the at least one file or a size of the at least one file exceeding a certain threshold, and
        uploading, by the script, the sections to an endpoint on a network, the endpoint being associated with the file.

8. The non-transitory computer-readable medium of claim 7, wherein uploading the sections to the endpoint associated with the file includes attaching each section of the sections to a respective Hypertext Transfer Protocol (HTTP) request and sending the section to the endpoint associated with the file.

9. The non-transitory computer-readable medium of claim 7, wherein the one or more virtual disk images include at least two virtual disk images that are associated with respective VMs and are uploaded to distinct datastores accessible by host computers which execute each of the respective VMs.

10. The non-transitory computer-readable medium of claim 7, wherein the archive file further includes:
    one or more CD ROM or floppy images attached to the one or more VMs, wherein sections of the CD ROM or floppy images are uploaded to datastores to which the one or more virtual disk images associated with the one or more VMs are uploaded;
    a manifest including checksums used to validate integrity of the files in the archive file; and
    a certificate file used to authenticate the archive file.

11. The non-transitory computer-readable medium of claim 7, wherein the one or more VMs are created by invoking an application programming interface (API) provided by a hypervisor or a VM management application.

12. The non-transitory computer-readable medium of claim 7, wherein the archive file is an Open Virtual Appliance (OVA) file or other TAR format file.

13. A computer system, comprising:
   one or more processors;
   a memory, wherein the memory includes an application program configured to perform operations for processing an archive file, which includes a plurality of files, in a web browser, the operations comprising:
      parsing, by a script executed by the web browser, the archive file to identify the plurality of files in the archive file and locations of the plurality of files in the archive file, wherein the identified locations include a respective offset and size of each of the plurality of files in the archive file, wherein parsing the archive file includes reading header fields of each of the plurality of files in the archive file to identify the plurality of files in the archive file but skipping contents of the plurality of files, and wherein skipping the contents of the plurality of files comprises refraining from locally storing the contents of the plurality of files, wherein:
      the archive file includes one or more virtual machine (VM) configuration files and one or more virtual disk images associated with one or more VMs,
      the one or more VMs are created based on the one or more VM configuration files in the archive file, and
      each of the one or more virtual disk images in the archive file is uploaded to a datastore accessible by a host computer which executes a corresponding one of the one or more created VMs, and
   for at least one of the plurality of files that are identified:
      dividing, by the script, a portion of the at least one file into sections based, at least in part, on a type of the at least one file or a size of the at least one file exceeding a certain threshold, and
      uploading, by the script, the sections to an endpoint on a network, the endpoint being associated with the file.

14. The computer system of claim 13, wherein uploading the sections to the endpoint associated with the file includes attaching each section of the sections to a respective Hypertext Transfer Protocol (HTTP) request and sending the section to the endpoint associated with the file.

* * * * *